No. 799,633. PATENTED SEPT. 19, 1905.
G. H. CLARK.
DEVICE FOR HOLDING BEVELED GLASS.
APPLICATION FILED AUG. 6, 1904.
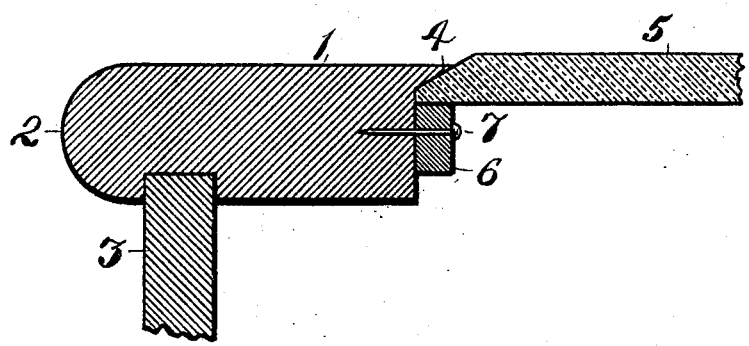
Witnesses:
A. E. Kling
W. E. Wood
Inventor.
G. H. Clark.
by C. E. Humphrey.
Atty.

UNITED STATES PATENT OFFICE.

GEORGE H. CLARK, OF BARBERTON, OHIO.

DEVICE FOR HOLDING BEVELED GLASS.

No. 799,633.     Specification of Letters Patent.     Patented Sept. 19, 1905.

Application filed August 6, 1904. Serial No. 219,768.

*To all whom it may concern:*

Be it known that I, GEORGE H. CLARK, a citizen of the United States, residing at Barberton, in the county of Summit and State of Ohio, have invented a certain new and useful Improvement in Devices for Holding Beveled Glass, of which the following is a complete specification.

This invention relates to devices for retaining sheets of beveled glass in position.

Heretofore it has been customary to hold beveled glass in place by placing its beveled face in a rabbeted opening having a square or right-angled shoulder and retaining it there by a stop parallel with the side of the rabbeted against which the bevel rests. This has not been satisfactory for a number of reasons, among which is the fact that a very poor and leaky joint is secured between the frame and the glass due to imperfect contact.

Therefore the object of this invention is to overcome all these objections urged against the former mode of holding beveled glass by providing an extremely accurate and serviceable device in which the face of the rabbet against which the beveled face of the glass rests will have an inclination substantially equivalent to the bevel of the glass, thereby insuring a wider area of contacting surfaces between the frame and glass, resulting in a more perfect joint, with less liability of fracture of the glass.

To the accomplishment of the aforesaid objects my invention consists in the peculiar and novel construction, combination, and arrangement of the various parts hereinafter described, reference being had to the accompanying drawing, forming a part hereof.

In the accompanying drawing the figure shows a transverse section of a show-case frame with a beveled glass held therein.

In the drawing, 1 represents a transverse section of the frame of a show-case used for displaying goods for sale. The front 2 of this frame is given any desired formation suitable to the use to which it is to be put. Into a groove or channel in the lower face of this frame is inserted a strip 3, which will serve to show the outer part of the frame or sash of the vertical front side of the show-case. The inner or back face of this frame 1 is cut a portion of its width substantially perpendicular or at right angles to the top and bottom faces. This rear perpendicular face is united with the top face by an inclined face 4, having a slant substantially approximating the bevel of the glass 5. The glass 5 is placed in position as shown in the drawing and is retained there by an ordinary stop 6, secured by an appropriate means, as nails 7. In making these frames the point of the material formed by the junction of the top face and the inclined face 4 should properly project far enough to substantially hide the stop 6.

It will be obvious that various modifications of the manner of locating the glass in position, such as sinking the entire beveled portion thereof in the frame, so as to leave the upper surfaces of the frame 1 and the glass 5 in a true plane, may be adopted and used without in any way departing from the scope of my invention.

What I claim is—

The combination in a device of the class designated, of a frame with a rabbet in one edge having one inclined face to receive the bevel of the glass, the inclination of which is approximately the same as the bevel of the glass to be held, a beveled glass arranged with its beveled face against said inclined face of said frame, a stop adapted to be fastened to said frame and bear against the rear face of said glass of such a thickness as to be approximately concealed by the glass-holding portion of said frame and leave the body portion of said glass uncovered.

In testimony that I claim the above I hereunto set my hand in the presence of two subscribing witnesses.

GEORGE H. CLARK.

Witnesses:
     C. E. HUMPHREY,
     W. G. GOOD.